Dec. 9, 1930.  C. D. BELL  1,784,684
PULLING HAND TOP
Filed Oct. 11, 1929  2 Sheets-Sheet 1

INVENTOR.
Codie D. Bell
BY
ATTORNEY

Dec. 9, 1930.  C. D. BELL  1,784,684
PULLING HAND TOP
Filed Oct. 11, 1929  2 Sheets-Sheet 2
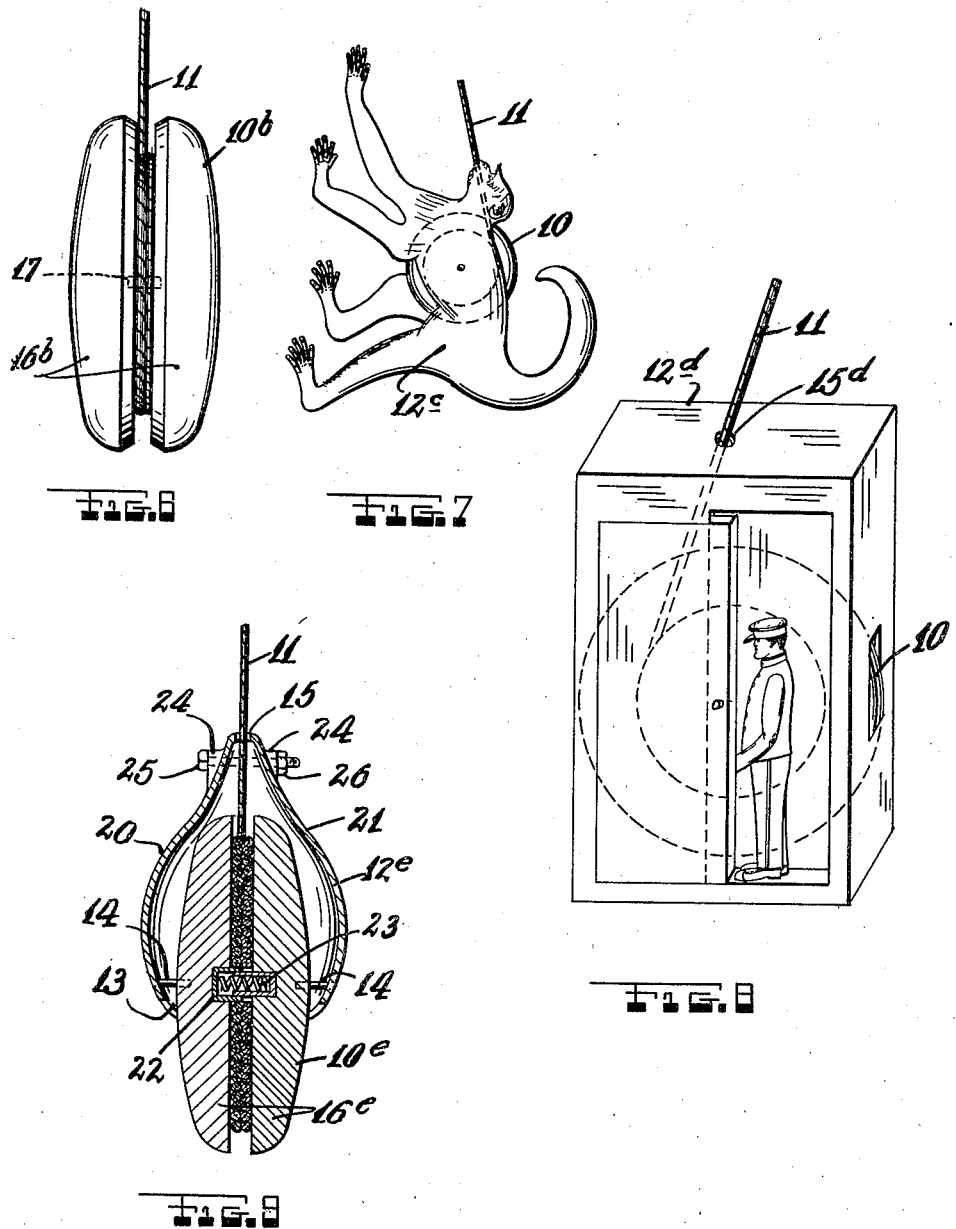
INVENTOR.
Codie D. Bell
BY
ATTORNEY Patented Dec. 9, 1930

1,784,684

UNITED STATES PATENT OFFICE

CODIE D. BELL, OF NEW YORK, N. Y.

PULLING HAND TOP

Application filed October 11, 1929. Serial No. 398,828.

This invention relates to new and useful improvements in pulling hand tops.

The invention has for an object the provision of articles of the class mentioned which are of simple durable construction, dependable in use and efficient in action, and which can be manufactured and sold at a reasonable cost.

It is proposed to form each novelty article with a casing of a shape and design simulating a fish, an animal or any other object, and rotatively supporting a slightly projecting member arranged for receiving a wound cord having its free end extended thru the casing, and said member upon unwinding from the cord under the influence of gravity to automatically rewind due to its momentum making it appear as though the casing travels up and down due to stretching and contracting of the cord. When the said casing is of frog shape, it is proposed to eccentrically connect the said member for causing leaping of the frog during operation. It is also proposed to make said member adjustable to accommodate different numbers of turns of the said cord.

For further comprehension of the invention, and of the objects, and advantages thereof, reference will be had to the following description and accompanying drawings, and to the appended claims in which the various novel features of the invention are more particularly set forth.

In the accompanying drawings forming a material part of this disclosure:—

Fig. 6 is an edge elevational view of a member similar to the one shown in Fig. 5 but of modified form.

Fig. 7 is a perspective view of another article constructed according to the same invention.

Fig. 8 is a perspective view of another object constructed according to the same invention.

Fig. 9 is a view similar to Fig. 3 but illustrating another embodiment.

Each of the novelty articles consists of a casing of a design and shape simulating a fish, an animal or any other object, and rotatively supporting a slightly projecting member 10 arranged for receiving a wound cord 11 having its free end extended thru the casing, and said member 10 upon unwinding from the cord under the influence of gravity such as when one holds the top end of the cord and drops the remaining portions of the article, to automatically rewind after the cord has been completely unwound due to its momentum in continuing rotation thus making it appear as though the casing travels up and down due to stretching and contracting of the cord.

Figure 1:
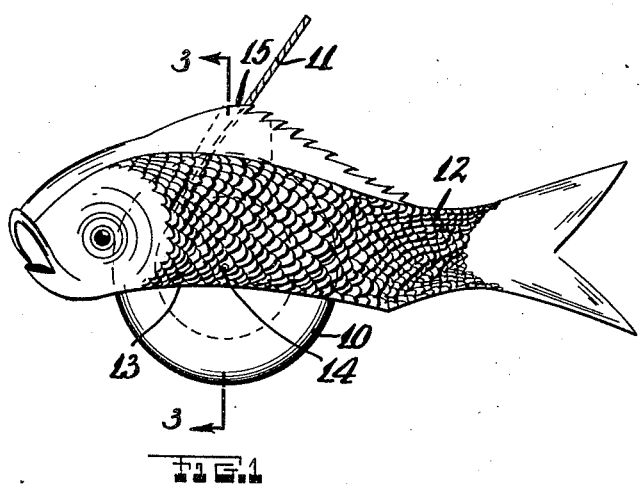
Fig. 1 is a side elevational view of a device constructed according to this invention.
Figure 3:
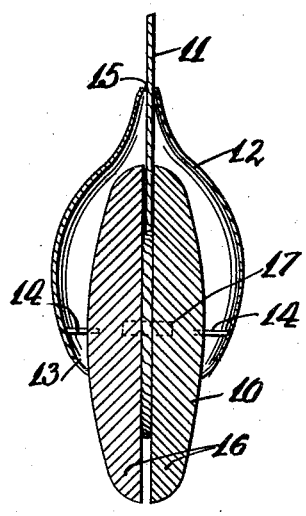
Fig. 3 is a transverse sectional view taken on the line 3—3 of Fig. 1.
Figure 2:
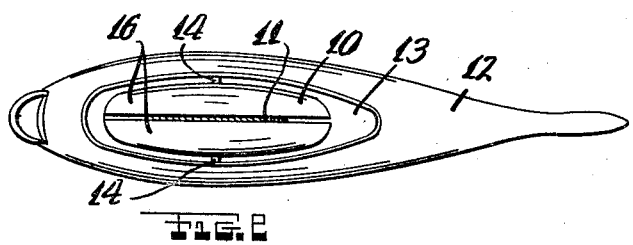
Fig. 2 is a bottom view of Fig. 1.

In Figs. 1, 2 and 3, a casing 12 has been illustrated of fish shape. This casing is hollow and opened at the bottom 13. Trunnions 14 are arranged within the casing near the opened bottom 13. The casing is also formed with a top aperture 15 thru which the cord 11 extends. The said member 10 consists of a pair of discs 16 held slightly spaced by a stud shaft 17. The centers of the outer sides of the discs are formed with apertures in which the trunnions 14 engage for rotatively supporting the member. The said cord 11 is wound upon the shaft 17 in a single spiral as may be seen from an inspection of Figs. 2 and 3.

Figure 4:
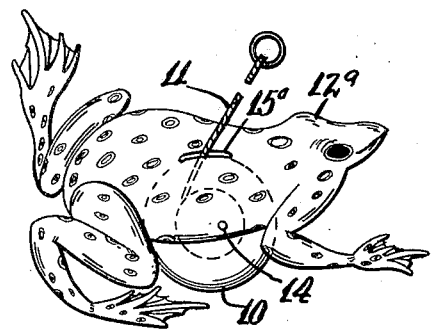
Fig. 4 is a perspective view of a modified form of the device.
Figure 5:
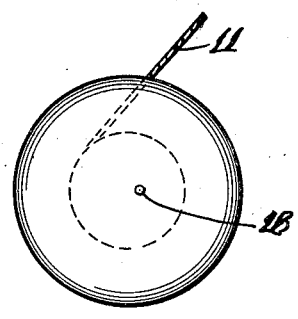
Fig. 5 is a side elevational view of the member used within the article shown in Fig. 4.

In Figs. 4 and 5, a modified form of the invention has been disclosed in which a casing 12ª has been illustrated of frog shape. This casing is hollow and opened at the bottom and provided with trunnions 14 similar to the arrangement in the before described form. The casing 12ª is formed with a top slot 15ª thru which the cord 11 passes. The said member 10 is identical to the one previously described but differs in that the apertures on the outer faces of the discs are eccentric instead of concentric. Numeral 18 in Fig. 5 indicates the eccentric apertures. The cord 11 is wound upon the stud shaft as before described and extends thru the slots 15ª.

In Fig. 6, a modified form of inertia member 10$^b$ has been shown. This member consists of a pair of heavy metal discs 16$^b$ held in spaced relations by a stud shaft 17. The said cord 11 is wound upon the shaft 17 in a two adjacent-turn spiral. The space between the inner faces of the discs should be sufficient to permit the two turns.

In the modified form shown in Fig. 7, the said casing is of monkey shape and indicated by reference numeral 12$^c$. The body of the monkey shape is hollow and opened at the bottom, and the member 10 is rotatively supported within the hollow and slightly projects from the opening. The supporting is accomplished by trunnions as previously pointed out. The cord 11 from the member 10 extends thru the body of the monkey and leads thru an aperture in the top of the head. In other respects this form is similar to the previous described ones.

In Fig. 8 another modified form of article has been shown which simulates an elevator. Numeral 12$^d$ indicates the casing which is of such shape and design to look like a miniature elevator. The casing is hollow and is formed with a side opening thru which the member 10 projects. The member 10 is rotatively mounted within the casing by trunnions in a manner before described relative to the other forms. The casing 10$^d$ is also provided with a top aperture 15$^d$ thru which the cord 11 extends.

In the modified form of the device illustrated in Fig. 9, a casing 12$^e$ has been illustrated and is composed of two sections, namely 20 and 21 hingedly connected at the top. The casing is of hollow construction and opened at the bottom indicated by reference numeral 13. It is provided with the trunnions 14 which support the member 10$^e$. It is also provided with a top aperture 15 thru which the cord 11 extends.

The said member 10$^e$ consists of a pair of discs 16$^e$ held slightly spaced from each other by an adjustable shaft 22 between the inner centers. The adjustable shaft consists of telescopic sections and an expansion spring 23 urging the sections apart. A means is also provided for holding the sections 20 and 21 of the casing in adjusted pivoted positions for determining the distance between the discs 16$^e$.

The said means consists of bosses 24 upon the sections 20 and 21 and a bolt 25 engaged thru the bosses and provided with an adjustment nut 26. The nut 26 may be adjusted for changing the spread between the sections 20 and 21 and thus adjusting the distance between the discs 16 for accommodating a single spiral of the cord 11 or a two or more adjacent-turn spiral.

In operation of the various articles described, one rotates the member within the casing for winding the cord upon it, then holds the top of the cord and allows the object to drop. The member within the casing rotates as the cord unwinds and obviously moves downwards. The casing also moves downwards and is held in a vertical position by the cord passing thru the top aperture.

When the cord has been completely unwound from the member within the casing, the inertia that the member gained during its descent continues and causes the member to wind itself upon the cord 11 thus rising. The person holding the top of the cord may slightly jerk the cord at a moment slightly before the last turn is off the member during the descent and add new force for overcoming the frictional losses, and thus may continue the operation of the device indefinitely. In the form shown in Fig. 4, the frog will leap back and forth due to the eccentric connection with the member 10.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A pulling hand top, comprising a casing of any shape and design rotatively supporting a slightly projecting member arranged for receiving a wound cord having its free end extended thru the casing and said member upon being unwound from the cord under the influence of gravity automatically rewinds thereon due to its momentum making it appear as though the casing travels up and down due to stretching and contracting of the cord, said casing consisting of two hinged sections with trunnions supporting said member, and said member consisting of a pair of discs connected by an adjustable shaft, a spring urging the discs apart, and means for holding the sections of the casing in adjusted pivoted position for determining the distance between said discs.

2. In a device of the class described, a casing formed of two sections, means for adjusting the casing sections relative to each other, a circular member rotatively supported by and projecting from said casing, said circular member consisting of two discs, a shaft connecting said discs formed of slidably engaging sections, and means situated in the shaft normally urging the discs apart so as to maintain rotatively supported positions of the discs within the adjusted sections of the casing.

3. In a device of the class described, a casing formed of two sections, means for adjusting the casing sections relative to each other, a circular member rotatively supported by and projecting from said casing, said circular member consisting of two discs, a shaft connecting said discs formed of slidably engaging sections, means situated in the shaft normally urging the discs apart so as to maintain rotatively supported positions of the discs within the adjusted sections of the casing, and said means for adjusting the casing sections relative to each other comprises bosses formed upon the sections, a bolt engaging through the bosses, and an adjustment screw threadedly engaged upon the bolt.

In testimony whereof I have affixed my signature.

CODIE D. BELL.